United States Patent [19]
Moser

[11] Patent Number: 6,037,875
[45] Date of Patent: Mar. 14, 2000

[54] METHOD AND APPARATUS FOR PROVIDING NOTIFICATION OF THE FALLING MOTION OF A TREE

[76] Inventor: Donald A. Moser, P.O. Box 2748, Eugene, Oreg. 97402

[21] Appl. No.: 09/286,283

[22] Filed: Apr. 5, 1999

[51] Int. Cl.⁷ .................................................. G08B 21/00
[52] U.S. Cl. ...................... 340/686.1; 340/686.1; 340/689; 200/61.18
[58] Field of Search .................. 340/680, 686.1, 340/687, 689, 686.2, 539, 531, 671; 200/61.18, 61.45 R, 61.52

[56] References Cited

U.S. PATENT DOCUMENTS 5,015,998   5/1991   Ellis et al. ........................ 340/686.1
5,646,601   7/1997   Wallace et al. .................... 340/686.1

*Primary Examiner*—Jeffery A. Hofsass
*Assistant Examiner*—Daniel Previl
*Attorney, Agent, or Firm*—Robert M. Storwick

[57] ABSTRACT

A method and apparatus for providing notification of the falling motion of a tree. An angular sensor produces a sensor signal when its angle is changed beyond a predetermined angle by the falling motion of the tree to which the angular sensor is attached. Receipt of the sensor signal causes a transmitter to send an alarm signal over a 900 MHz spread spectrum channel to a receiver. The receiver generates a vocal message which is, in turn, cyclically sent over a wireless or wired telephone link to a law-enforcement agency or a party representing the landholder. If a particular telephone in the cycle of telephones does not answer, the receiver attempts to connect over another telephone link.

45 Claims, 1 Drawing Sheet

METHOD AND APPARATUS FOR PROVIDING NOTIFICATION OF THE FALLING MOTION OF A TREE

TECHNICAL FIELD

The present invention relates to a method and apparatus for providing notification, and more particularly, to a method and apparatus for providing notification of the falling motion of a tree.

BACKGROUND OF THE INVENTION

Present-day logging practices typically involve a landholder granting a logging concern the right to log the trees in a geographical region. Generally the geographical region is portion of land held by the landholder. The boundary of the geographical region is typically specified, and certain trees within the region which are exempt from harvesting are marked with special tapes or paints to clearly denote their exempted status.

It is frequently difficult for the landholder to constantly monitor the harvesting operation within the geographical region. As a result, unauthorized harvesting of trees located outside the geographical region, as well as harvesting of exempted trees located inside the geographical region, occurs frequently. This unauthorized harvesting is clearly contrary to the intent of the grant and, in the case where trees are harvested outside the geographical region, can result in damage to an adjacent landholder.

If the landholder can be given notification that an unauthorized harvesting is occurring, such operations can be more successfully monitored. Consequently, it is desirable to have a method and apparatus to provide notification of the falling motion of a tree to the landholder.

SUMMARY OF THE INVENTION

According to one aspect, the invention is an apparatus for providing notification of the falling motion of a tree from a first angle to a second angle. The first angle and the second angle differ by a predetermined angular range.

The apparatus includes an angular sensor, a transmitter, and a receiver. The angular sensor is attached to the tree. The angular sensor produces a sensor signal when the tree moves from the first angle to the second angle. The transmitter is adapted to receive the sensor signal from the angular sensor and to transmit an alarm signal in response thereto. The receiver is adapted to receive the alarm signal. The receiver is located at a first site that is remote from the angular sensor and the transmitter. The receiver communicates the receipt of the alarm signal to a second site that is remote from the angular sensor, the transmitter and the receiver. The receipt of the alarm signal is notification of the falling motion of the tree.

According to another aspect, the invention is an apparatus for providing notification of the falling motion of any tree in a plurality of trees located in a geographical region. The falling motion is from a first angle to a second angle. The first angle and the second angle differ by a predetermined angular range.

The apparatus includes a plurality of angular sensors, a plurality of transmitters, and a receiver. Each of the angular sensors is attached to a distinct tree in the plurality of trees. The angular sensor produces a sensor signal when a tree moves from the first angle to the second angle.

Each of the transmitters in the plurality of transmitters is connected to a distinct one of the angular sensors. Each of the transmitters is adapted to receive the sensor signal from the angular sensor and to transmit an alarm signal in response thereto. The receiver is adapted to receive the alarm signal transmitted by any transmitter in the plurality of transmitters. The receiver is located at a first site that is remote from any angular sensor in the plurality of angular sensors and from any transmitter in the plurality of transmitters.

The receiver communicates the receipt of the alarm signal to a second site that is remote from any angular sensor in the plurality of angular sensors, from any transmitter in the plurality of transmitters and from the receiver. The receipt of the alarm signal is notification of the falling motion of the tree.

According to yet another aspect, the invention is a method for providing notification of the falling motion of a tree from a first angle to a second angle. The first angle and the second angle differ by a predetermined angular range.

The method includes the steps of: a) producing a sensor signal when the tree moves from the first angle to the second angle, b) receiving the sensor signal, c) transmitting an alarm signal in response to receiving the sensor signal, d) receiving the alarm signal at a first site which is remote from the tree, and e) communicating the receipt of the alarm signal to a second site, which is remote from the angular sensor, the transmitter and the receiver, the receipt of the alarm signal being notification of the falling motion of the tree.

According to a still further aspect, the invention is a method for providing notification of the falling motion of any tree in a plurality of trees located in a geographical region. The falling motion is from a first angle to a second angle. The first angle and the second angle differ by a predetermined angular range.

The method includes the steps of: a) producing a sensor signal when any tree in the plurality of trees moves from the first angle to the second angle; b) receiving the sensor signal in the vicinity of the tree; c) transmitting an alarm signal in response to receiving the sensor signal, the alarm signal being transmitted from the vicinity of the tree; d) receiving the alarm signal at a first site which is remote from any tree in the plurality of trees; and e) communicating the receipt of an alarm signal to a second site that is remote from the vicinity of the plurality of trees. The receipt of the alarm signal is notification of the falling motion of the tree.

According to a still further aspect, the invention is an apparatus for providing notification of the falling motion of a tree from a first angle to a second angle. The first angle and the second angle differ by a predetermined angular range. The apparatus includes means for producing a sensor signal when the tree moves from the first angle to the second angle, means for receiving the sensor signal, and means for transmitting an alarm signal in response to receiving the sensor signal. The apparatus also include means for receiving the alarm signal at a first site that is remote from the tree, and means for communicating the receipt of the alarm signal to a second site. The second site is remote from the angular sensor, the transmitter and the receiver. The receipt of the alarm signal is notification of the falling motion of the tree.

According to yet another further aspect, the invention is an apparatus for providing notification of the falling motion of any tree in a plurality of trees located in a geographical region. The falling motion is from a first angle to a second angle. The first angle and the second angle differ by a predetermined angular range. The apparatus includes means for producing a sensor signal when any tree in the plurality of trees moves from the first angle to the second angle, means for receiving the sensor signal in the vicinity of the tree, and means for transmitting an alarm signal in response to receiving the sensor signal. The alarm signal is transmitted from the vicinity of the tree. The apparatus further includes means for receiving the alarm signal at a first site that is remote from any tree in the plurality of trees, and means for communicating the receipt of an alarm signal to a second site that is remote from the vicinity of the plurality of trees. The receipt of the alarm signal is notification of the falling motion of the tree.

DETAILED DESCRIPTION OF THE PREFERRED EMBODIMENT OF THE INVENTION

Figure 1:
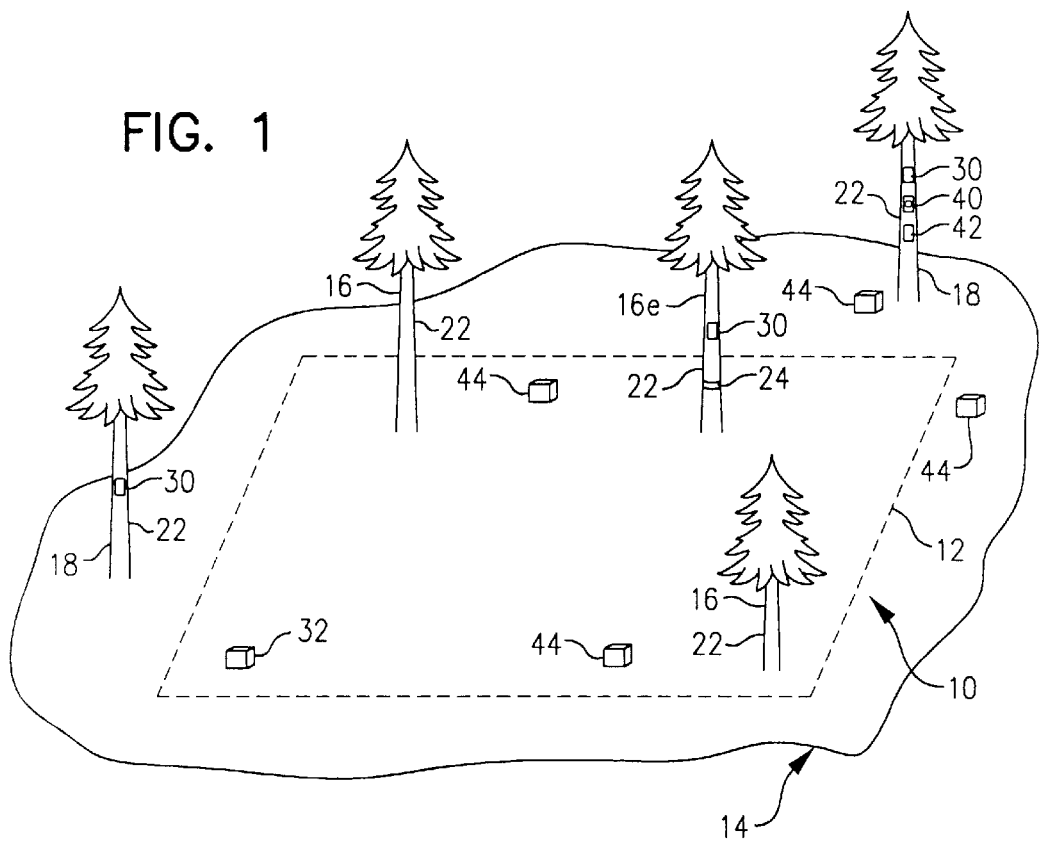
FIG. 1 is a schematic diagram of the vicinity of a geographical region that is to be harvested.

FIG. 1 is a schematic diagram of the vicinity of a geographical region that is to be harvested. The geographical area 10 is an area having a precisely determined boundary 12. The geographical area 10 is located within a larger area 14 which may, or may not, be held by the holder of the land in the geographical area 10. The geographical area 10 is shown to have a rectangular boundary 12, although it will be understood by those skilled in the art that the boundary 12 can have any contour that can be defined precisely.

A plurality of in-bounds trees 16 grow within the boundary 12, while other out-of-bounds trees 18 grow outside the boundary 12 but inside the larger area 14. Each of these trees 16 and 18 has a trunk 22. Included among the in-bounds trees 16 are certain exempted trees (such as tree 16e) whose trunk 22 is marked by a piece of tape or a painted stripe 24 which has a highly-visible color.

Exempted in-bounds trees (such as tree 16e) and out-of-bounds trees 18 that are close to the boundary 12 each have a sensor-transmitter device 30 attached to their trunks 22. The sensor-transmitter devices 30 are typically installed on a trunk 22 at a height of approximately 15 feet above ground, although the choice of the installation height is dependent upon the application. The sensor-transmitter devices 30 can be colored or camouflaged as desired.

The sensor-transmitter devices 30 are a part of the present invention, which also includes a receiver (or base station) 32 that is located in the larger area 14 and within, or close to, the geographical area 10.

As will be shown in greater detail subsequently, each of the sensor-transmitter devices 30 is capable of transmitting an alarm signal when the trunk 22 to which the sensor-transmitter device 30 is attached falls to an angle outside of a predetermined range of angles. The predetermined range of angles is chosen to include the range of angles that the trunk 22 might experience due to wind or other normal environmental influences, so that the alarm signal will not be transmitted simply because the trunk 22 is bending due to these normal environmental influences.

The alarm signal includes a designation of the particular tree (16e or 18) to which the sensor-transmitter device 30 is attached. The alarm signal is received by the receiver 32 which then communicates the receipt of the alarm signal to a second site (not shown), that is remote from the sensor-transmitter devices 30 and the receiver 32. The receipt of the alarm signal is notification of the falling motion of the tree whose sensor-transmitter device 30 transmitted the alarm signal. In addition to transmitting the designation of the particular tree to which the sensor-transmitted device 30 is attached, the receiver can also communicate an indication of the geographical region 10 with which the particular tree is associated.

Some of the trees 16 or 18 can also be fitted with one or more wireless video cameras 40 attached to their trunks 22. The wireless video cameras 40 can provide wireless visual remote monitoring of the geographical region 10. If desired, video (and other conventional) signals from the video cameras 40 can be transmitted to the receiver 32, which then transmits corresponding signals to some remote site. The video signals can include time, date, and event information. Other sensors which can also be attached to or otherwise associated with a particular trunk 22 are motion detecting sensors 42, including those having active and passive IR (PIR) beams. One such PIR sensor is the model A206S, produced by Inovonics, of Boulder, Colo. Further, seismic sensors 44 can be placed within, or adjacent to, the geographical region 10. Alarm signals from these seismic sensors 44 (indicating unauthorized activity in the geographical region 10) can also be transmitted to the receiver 32.

Figure 2:
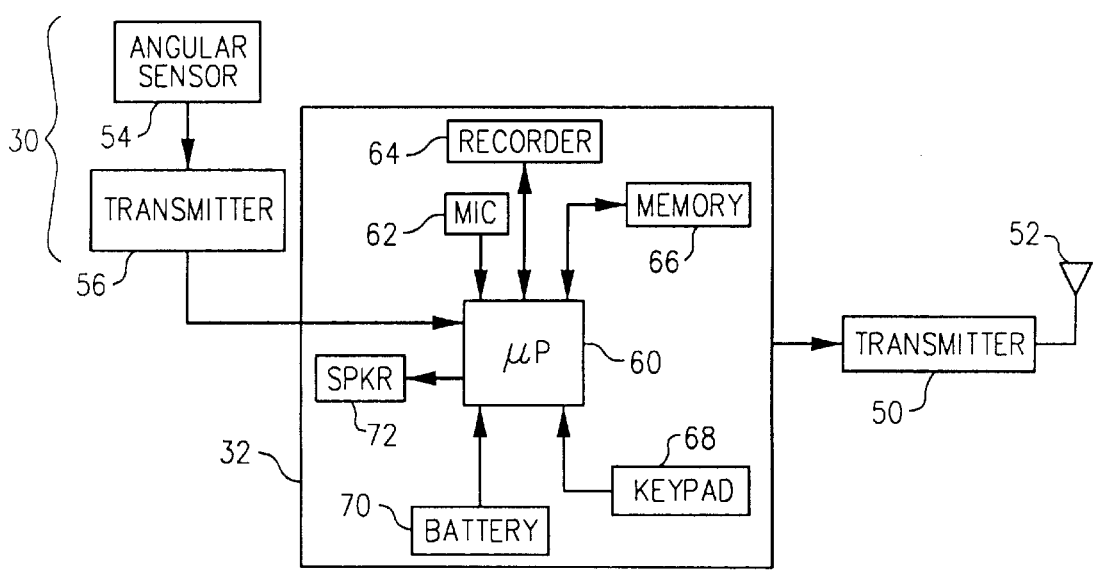
FIG. 2 is a block diagram of the preferred embodiment of the invention.

FIG. 2 is a block diagram of the preferred embodiment of the invention. The preferred embodiment includes the sensor-transmitter device 30 and the receiver 32. The preferred embodiment may also include a transmitter 50 and an antenna 52 for transmitting notification signals to a remote site. The transmitter 50 can be considered to be a part of the receiver 32, in which case the combination of the receiver 32 and the transmitter 50 is a transceiver.

Preferably, the transmitter device 30 and the receiver 32 are both placed in an integral weather- and environment-proof container which has tabs that allow the package to be easily attached to the trunk 22, such as by means of conventional wallboard nails. The container can be placed under camouflaged cover along the trunk 22, if desired. Within the sensor-transmitter device 30 is an angular sensor 54 and a transmitter 56. The angular sensor 54 is an omnidirectional tilt-sensing switch that causes a switch closure when the angle of the angular sensor 54 exceeds a predetermined angle. Such an angular sensor is model no. 2008-4, made by Signal Systems International of Lavallette, N.J. The angular sensor 54 senses when the angle of the trunk 22 to which it is attached passes outside of the range of angles (measured from the original orientation of the trunk 22), such as a 45-degree range, and produces a sensor signal in response. This is taken to be an indication that the trunk 22 has been harvested, upon which event a notification is appropriate. The angular sensor 54 can, for example, be of the type formed from a magnetic reed switch, as will be known by those skilled in the art, although any other suitable sensor capable of detecting excursion beyond the angular range can be used.

The transmitter 56, which receives a sensor signal from the angular sensor 54, transmits an alarm signal in response. The alarm signal can include an indication of the particular tree to which the sensor-transmitter device 30 is attached. The transmitter 56 also includes a power source, such as a battery (not shown), which supplies the electrical energy necessary for the transmitter 56 to operate. Over the course of time, the power source may become depleted or otherwise tend to become inoperative, in which case the transmitter 56 can transmit an alarm signal indicating the problem with the power source. Although the transmitter can transmit the alarm signal to the receiver 32 through a conventional wire, preferably the alarm signal will be transmitted wirelessly. One preferred model of wireless transmitter is the model FA210 universal transmitter, made by Inovonics, of Boulder, Colo. This model transmitter is of a reduced size and is powered by a conventional 3-volt lithium battery. It allows the sensor-transmitter 30 to be programmed to transmit a check-in signal periodically, say, every 5 minutes, 60 seconds, 30 seconds, or 10 seconds. The check-in signal will include a portion that identifies the particular trunk 22 to which the sensor-transmitter device 30 is attached.

The check-in signal will be an alarm signal in the case that a sensor signal is produced by the angular sensor 54, although the alarm signal will be sent as soon as the angular sensor 54 produced the sensor signal. After the alarm signal is first transmitted, it will continue to be transmitted as part of the check-in signal.

The receiver (or base station) 32 includes components, such as a programmed microprocessor 60, a microphone 62, a recorder 64, a memory 66, a keypad 68, a battery 70 and a speaker 72. The receiver 32 is located at a first site that is remote from the angular sensor 54 and the transmitter 56. The programmed microprocessor 60 receives the alarm signal from the sensor-transmitter device 30 and communicates the fact that an alarm signal has been received to a second site which is separate from the geographical area 10 as well as the first site (where the receiver 32 is located). Typically this communication occurs through the transmission of a wireless signal produced by the transmitter 50 in response to signals received from the receiver 32, as will be known by those skilled in the relevant arts, although it could also occur through a conventional wired telephone. The transmitter 50 can, for example, be a cellular telephone and/or a wired telephone that sends the notification to a party representing the landholder and/or a law enforcement agency.

The microphone 62 is used to receive vocal information that is recorded in the recorder 64 by a human user. This vocal information includes, for example, an identification of the geographical area 10. The memory 66 retains information needed by the programmed microprocessor 60 as will be known by those skilled in the computer programming arts. The keypad 68 is used to provide additional controls, such as designating that the vocal information being received by the microphone 62 is information concerning the geographical area 10, or possibly an alarm message. The battery 70 provides electrical power to the components in the receiver 32, but is also connected to the microprocessor 60 which causes a signal to be transmitted when the battery 70 is depleted to a certain extent.

In practice, the receiver 32 is programmed and tested with the overall system shown in FIG. 2 before the field installation of the system is complete. Vocal information concerning the various trees that have sensor/transmitter devices 30 is recorded using the microphone 62 and the keypad 68. In the preferred embodiment, the keypad 68 is a DTMF touchpad having 16 keys (the digits from 0 through 9 and letters A, B, C and D). To enter vocal information concerning a particular geographical area 10, a user activates the site number recording activity by pressing the A key on the keypad 68, then entering a site number, which is a sequence of up to three keystrokes into the keypad 68 (for example, "457"), followed by speaking an identification of the site number (for example, "site number 457"). The entry of vocal information concerning a particular geographical area 10 is complete when an entry has been made for each site which the receiver 32 will service. This vocal information will be used when an angular sensor 54 causes the corresponding transmitter 56 to transmit an alarm signal for a particular site. The alarm signal contains information identifying the particular site, and the receiver 32 causes the corresponding site number message to be transmitted.

Alarm messages for delivery by the receiver 32 can be recorded next. This is accomplished by pressing the B key on the keypad 68, then entering an alarm message number sequence of up to three keystrokes into the keypad 68 (for example, "003"), followed by speaking the alarm message into the microphone 62 (for example, "tree number 16, unit 754, row 24 has fallen"). When a corresponding sensor 54 causes the associated transmitted 56 to transmit an alarm signal relative to a particular alarm condition (for example, "battery at site 367 is running low") that message is transmitted to the number on the phone number list.

Next, a phone number list can be recorded. The phone number list is a list of up to four telephone numbers which the receiver 32 will attempt to reach in the case of an alarm condition. The receiver 32 will continually try to reach these telephone numbers until it is deactivated. This is accomplished by pressing the C key on the keypad 68, then entering the telephone number through the keypad 68 (for example, "703-308-4387"), followed by the C key again.

Finally, the system can be tested before installation by entering the test mode. This is accomplished by pressing the D key on the keypad 68, and then activating an angular sensor 54 which is intended to be placed on a particular tree 16e or 18. Activation of a particular angular sensor 54 causes an alarm signal to be transmitted to the receiver 32, which then transmits a notification message to a monitoring station operating on a preassigned test frequency. If the proper message is received at the monitoring station, the test continues with another angular sensor 54. After the system test is successfully completed, the test mode is disabled and the inventive system is installed.

Following installation in case a tree falls, the angular sensor 54 produces a sensor signal which causes the transmitter 56 to transmit an alarm signal. A receiver 32 receives the alarm signal. The receiver 32 attempts to alert the first telephone number on the calling list. If that telephone can be reached the receiver 32 leaves the message; otherwise, the receiver 32 attempts to alert the next telephone number on the calling list. This process continues, with the receiver 32 cycling among the up to four telephone numbers that have been programmed into the receiver 32, until at least one of the telephones has been reached, assuring that the notification has been given.

While the foregoing is a detailed description of the preferred embodiment of the invention, there are many alternative embodiments of the invention that would occur to those skilled in the art and which are within the scope of the present invention. For example, the present invention can be useful in situations where the integrity of an inventory of materials is to be monitored. By replacing the angular sensor with another sensor, such as a motion detector, which is attached to the individual pieces of inventory to be monitored, the present invention will be applicable to general inventory monitoring. Accordingly, the present invention is to be determined by the following claims.

I claim:

1. An apparatus for providing notification of the falling motion of a tree from a first angle to a second angle, the first angle and the second angle differing by a predetermined angular range, the apparatus comprising:

an angular sensor attached to the tree, the angular sensor producing a sensor signal when the tree moves from the first angle to the second angle;

a transmitter adapted to receive the sensor signal from the angular sensor and to transmit an alarm signal in response thereto; and a receiver adapted to receive the alarm signal, the receiver being located at a first site which is remote from the angular sensor and the transmitter, the receiver communicating the receipt of the alarm signal to a second site which is remote from the angular sensor, the transmitter and the receiver, the receipt of the alarm signal being notification of the falling motion of the tree.

2. The apparatus of claim 1, wherein the transmitter is powered by a battery, the transmitter further comprising a programmed microprocessor adapted to receive the sensor signal, to monitor the status of the battery, and to cause the transmitter to generate a signal chosen from a class of signals, the class of signals including the alarm signal and a battery condition signal, the battery condition signal including an indication when the voltage of the battery is below a predetermined voltage.

3. The apparatus of claim 1, wherein the angular sensor is mercury limit switch.

4. The apparatus of claim 1, wherein the transmitter is a spread spectrum transmitter.

5. The apparatus of claim 1, wherein the transmitter is a wireless transmitter.

6. The apparatus of claim 5, wherein the receiver includes a wireless transmitter.

7. The apparatus of claim 1, wherein the sensor signal is also produced if the sensor is tampered with.

8. An apparatus for providing notification of the falling motion of any tree in a plurality of trees located in a geographical region, the falling motion being from a first angle to a second angle, the first angle and the second angle differing by a predetermined angular range, the apparatus comprising:

a plurality of angular sensors, each of the angular sensors being attached to a distinct tree in the plurality of trees, the angular sensor producing a sensor signal when a tree moves from the first angle to the second angle;

a plurality of transmitters, each of the transmitters being connected to a distinct one of the angular sensors, each of the transmitters being adapted to receive the sensor signal from the angular sensor and to transmit an alarm signal in response thereto; and a receiver adapted to receive the alarm signal transmitted by any transmitter in the plurality of transmitters, the receiver being located at a first site which is remote from any angular sensor in the plurality of angular sensors and from any transmitter in the plurality of transmitters, the receiver communicating the receipt of the alarm signal to a second site which is remote from any angular sensor in the plurality of angular sensors, from any transmitter in the plurality of transmitters and from the receiver, the receipt of the alarm signal being notification of the falling motion of the tree.

9. The apparatus of claim 8, wherein the transmitter is powered by a battery, the transmitter further comprising a programmed microprocessor adapted to receive the sensor signal, to monitor the status of the battery, and to cause the transmitter to generate a signal chosen from a class of signals, the class of signals including the alarm signal and a battery condition signal, the battery condition signal including an indication when the voltage of the battery is below a predetermined voltage.

10. The apparatus of claim 8, wherein each angular sensor in the plurality of angular sensors is mercury limit switch.

11. The apparatus of claim 8, wherein each transmitter in the plurality of transmitters is a spread spectrum transmitter.

12. The apparatus of claim 8, wherein each transmitter in the plurality of transmitters is a wireless transmitter.

13. The apparatus of claim 12, wherein the receiver includes a wireless transmitter.

14. The apparatus of claim 8, wherein at least one of the trees is located within a predetermined area within the geographical region and at least one of the trees is located outside of the predetermined area but within the geographical region.

15. The apparatus of claim 8 wherein the alarm signals produced by each of the distinct transmitters in the plurality of transmitters are distinct from one another.

16. The apparatus of claim 15 wherein the alarm signals produced by the transmitters in the plurality of transmitters in response to distinct sensor signals are distinct.

17. The apparatus of claim 8, wherein each of the sensor signals is also produced if the sensor is tampered with.

18. A method for providing notification of the falling motion of a tree from a first angle to a second angle, the first angle and the second angle differing by a predetermined angular range, the method comprising the steps of:

a) producing a sensor signal when the tree moves from the first angle to the second angle;

b) receiving the sensor signal;

c) transmitting an alarm signal in response to receiving the sensor signal;

d) receiving the alarm signal at a first site which is remote from the tree; and e) communicating the receipt of the alarm signal to a second site, which is remote from the angular sensor, the transmitter and the receiver, the receipt of the alarm signal being notification of the falling motion of the tree.

19. The method of claim 18, wherein step c) is performed by a transmitter that is powered by a battery, the transmitter further including a programmed microprocessor adapted to receive the sensor signal, to monitor the status of the battery, and to cause the transmitter to generate a signal chosen from a class of signals, the class of signals including the alarm signal and a battery condition signal, the battery condition signal including an indication when the voltage of the battery is below a predetermined voltage.

20. The method of claim 18, wherein the sensor signal produced in step a) is produced by a mercury limit switch.

21. The method of claim 18, wherein step c) is performed by a spread spectrum transmitter.

22. The method of claim 18, wherein step c) is performed by a wireless transmitter.

23. The method of claim 22, wherein step b) is performed by a wireless transmitter.

24. A method for providing notification of the falling motion of any tree in a plurality of trees located in a geographical region, the falling motion being from a first angle to a second angle, the first angle and the second angle differing by a predetermined angular range, the method comprising the steps of:

a) producing a sensor signal when any tree in the plurality of trees moves from the first angle to the second angle;

b) receiving the sensor signal in the vicinity of the tree;

c) transmitting an alarm signal in response to receiving the sensor signal, the alarm signal being transmitted from the vicinity of the tree;

d) receiving the alarm signal at a first site which is remote from any tree in the plurality of trees; and e) communicating the receipt of an alarm signal to a second site that is remote from the vicinity of the plurality of trees, the receipt of the alarm signal being notification of the falling motion of the tree.

25. The method of claim 24, wherein step c) is performed by a transmitter that is powered by a battery, the transmitter further including a programmed microprocessor adapted to receive the sensor signal, to monitor the status of the battery, and to cause the transmitter to generate a signal chosen from a class of signals, the class of signals including the alarm signal and a battery condition signal, the battery condition signal including an indication when the voltage of the battery is below a predetermined voltage.

26. The method of claim 24, wherein the sensor signal produced in step a) is produced by a mercury limit switch.

27. The method of claim 24, wherein step c) is performed by a spread spectrum transmitter.

28. The method of claim 24, wherein step c) is performed by a wireless transmitter in a plurality of transmitters.

29. The method of claim 24, wherein at least one of the trees is located within a predetermined area within the geographical region and at least one of the trees is located outside of the predetermined area but within the geographical region.

30. The method of claim 24 wherein the alarm signals are distinct from one another.

31. The method of claim 30 wherein the alarm signals produced response to distinct sensor signals are distinct.

32. An apparatus for providing notification of the falling motion of a tree from a first angle to a second angle, the first angle and the second angle differing by a predetermined angular range, the apparatus comprising:

means for producing a sensor signal when the tree moves from the first angle to the second angle;

means for receiving the sensor signal;

means for transmitting an alarm signal in response to receiving the sensor signal;

means for receiving the alarm signal at a first site which is remote from the tree; and means for communicating the receipt of the alarm signal to a second site, which is remote from the angular sensor, the transmitter and the receiver, the receipt of the alarm signal being notification of the falling motion of the tree.

33. The apparatus of claim 32, wherein the means for transmitting includes a transmitter that is powered by a battery, the transmitter further including a programmed microprocessor adapted to receive the sensor signal, to monitor the status of the battery, and to cause the transmitter to generate a signal chosen from a class of signals, the class of signals including the alarm signal and a battery condition signal, the battery condition signal including an indication when the voltage of the battery is below a predetermined voltage.

34. The apparatus of claim 32, wherein the means for producing a sensor signal includes a mercury limit switch.

35. The apparatus of claim 32, wherein the means for transmitting includes a spread spectrum transmitter.

36. The apparatus of claim 32, wherein the means for transmitting includes a wireless transmitter.

37. The apparatus of claim 36, wherein the means for receiving the sensor signal includes a wireless transmitter.

38. A apparatus for providing notification of the falling motion of any tree in a plurality of trees located in a geographical region, the falling motion being from a first angle to a second angle, the first angle and the second angle differing by a predetermined angular range, the apparatus comprising:

means for producing a sensor signal when any tree in the plurality of trees moves from the first angle to the second angle;

means for receiving the sensor signal in the vicinity of the tree;

means for transmitting an alarm signal in response to receiving the sensor signal, the alarm signal being transmitted from the vicinity of the tree;

means for receiving the alarm signal at a first site which is remote from any tree in the plurality of trees; and means for communicating the receipt of an alarm signal to a second site that is remote from the vicinity of the plurality of trees, the receipt of the alarm signal being notification of the falling motion of the tree.

39. The apparatus of claim 38, wherein the means for transmitting an alarm signal includes a transmitter that is powered by a battery, the transmitter further including a programmed microprocessor adapted to receive the sensor signal, to monitor the status of the battery, and to cause the transmitter to generate a signal chosen from a class of signals, the class of signals including the alarm signal and a battery condition signal, the battery condition signal including an indication when the voltage of the battery is below a predetermined voltage.

40. The apparatus of claim 38, wherein means for producing a sensor signal includes a mercury limit switch.

41. The apparatus of claim 38, wherein the means for transmitting an alarm signal includes a spread spectrum transmitter.

42. The apparatus of claim 38, wherein the means for transmitting an alarm signal includes a plurality of transmitters.

43. The apparatus of claim 38, wherein at least one of the trees is located within a predetermined area within the geographical region and at least one of the trees is located outside of the predetermined area but within the geographical region.

44. The apparatus of claim 38 wherein the alarm signals are distinct from one another.

45. The apparatus of claim 44 wherein the alarm signals produced response to distinct sensor signals are distinct.

* * * * *